Nov. 25, 1958 E. M. ROSCHKE 2,862,048

SUBSCRIPTION TELEVISION SYSTEM

Filed Aug. 17, 1953 4 Sheets-Sheet 1

ERWIN M. ROSCHKE
*INVENTOR.*

BY Francis W. Crotty

HIS ATTORNEY.

Nov. 25, 1958 E. M. ROSCHKE 2,862,048

SUBSCRIPTION TELEVISION SYSTEM

Filed Aug. 17, 1953 4 Sheets-Sheet 2

ERWIN M. ROSCHKE
*INVENTOR.*

BY Francis W. Crotty

HIS ATTORNEY.

Nov. 25, 1958 E. M. ROSCHKE 2,862,048

SUBSCRIPTION TELEVISION SYSTEM

Filed Aug. 17, 1953 4 Sheets-Sheet 3

ERWIN M. ROSCHKE
*INVENTOR.*

BY Francis W. Crotty

HIS ATTORNEY.

ERWIN M. ROSCHKE
*INVENTOR.*
BY Francis W. Crotty
HIS ATTORNEY

United States Patent Office 2,862,048 Patented Nov. 25, 1958

2,862,048

SUBSCRIPTION TELEVISION SYSTEM

Erwin M. Roschke, Des Plaines, Ill., assignor to Zenith Radio Corporation, a corporation of Delaware Application August 17, 1953, Serial No. 374,716

9 Claims. (Cl. 178—5.1)

The present invention pertains to subscription television systems in which a television signal is distributed in coded form for use only in subscriber receivers having appropriate decoding apparatus actuated in accordance with the coding schedule of the telecast. This application is a continuation-in-part of copending application Serial No. 344,996, filed March 27, 1953, in the name of Eilers et al., and assigned to the present assignee.

Since the invention may be practiced in either a subscription television transmitter or receiver, the term "encoding" is used herein in its generic sense to encompass either coding at the transmitter or decoding at the receiver.

In the above-mentioned copending application, a subscription system is illustrated wherein a television signal is coded with a very high degree of complexity by varying the mode of signal translation at a faster-than-field rate; that is, the television signal is coded by altering some characteristic thereof at intervals occurring more frequently than the field-scanning intervals. Further secrecy may be obtained by changing the operating mode of the television system in accordance with one schedule at certain times and in accordance with a different schedule at other times and indicating to subscriber receivers the order in which such schedules are to be utilized. As described in one embodiment of the aforementioned application, a plurality of separate and independent binary counting chains having different counting ratios are individually actuated by line-synchronizing pulses to develop coding signals imposing a mode change in the system each time the active counting chain registers a predetermined count, for example, after every 13, 16 etc. line-trace intervals. A selecting device, which is actuated in accordance with a selecting schedule, selectively applies the coding signals from the counting chains to a coding device so that during certain time intervals mode changes are determined by one binary chain whereas at other times the mode changes are determined by another binary chain.

While the equipment required to realize the results of the described arrangement is not unduly complicated, it is desirable to simplify the equipment without detracting from the coding complexity or secrecy. To this end, and in accordance with the present invention, one counting mechanism which has a variable effective counting rate is employed to produce a coding signal representing a coding pattern determined by the adjusted rate of the counter. A selector apparatus actuated in accordance with a selecting schedule selectively applies signal pulses, such as line-synchronizing pulses, to one of a plurality of input circuits of the counting mechanism which exhibits one rate in response to pulses applied to one input but another rate in response to pulses applied to another of the input circuits. The counting mechanism may be directly coupled to the encoding device to effect actuation thereof and mode changes in the system when the counter registers a particular reference count.

It is, accordingly, an object of the present invention to provide a new and improved subscription television system in which a television signal is distributed in coded form for use only in subscriber receivers having appropriate decoding apparatus actuated in accordance with the coding schedule of the telecast.

It is another object of the present invention to provide a subscription television system of simplified construction in which the television signal is coded with a high degree of complexity.

An additional object of the invention is to provide an improved and simplified encoding arrangement for a subscription television system of the type disclosed in the aforementioned copending application.

A still further object of the invention is to provide an improved encoding apparatus for use at the transmitter and/or receiver of a subscription television system which may employ faster-than-field coding.

The encoding arrangement of the present invention may be employed in either the transmitter or receiver portion of a television system and comprises an encoding device which has at least two operating conditions each of which establishes a different operating mode in the system. A pulse-counting mechanism is coupled to the encoding device to effect actuation of the device from one to another of its operating conditions at spaced intervals depending upon the registration of a preselected count by the mechanism. The counting mechanism includes a plurality of counting stages and at least two input circuits individually coupled to an assigned one of the stages so that the absolute number of applied pulses required to effect the preselected count registration is determined by the energizing of the input circuits. The encoding arrangement further comprises a source of signal pulses to be applied to the counting mechanism and also a selector for connecting the source to a selected one of the input circuits at any operating instant. Finally, means are provided for applying a selecting signal to the selector to establish the sequence in which the input circuits are singularly connected to the source in accordance with a schedule represented by the selecting signal.

The features of this invention which are believed to be new are set forth with particularity in the appended claims. The invention, together with further objects and advantages thereof, may best be understood, however, by reference to the following description in conjunction with the accompanying drawings, in which:

Figure 1:
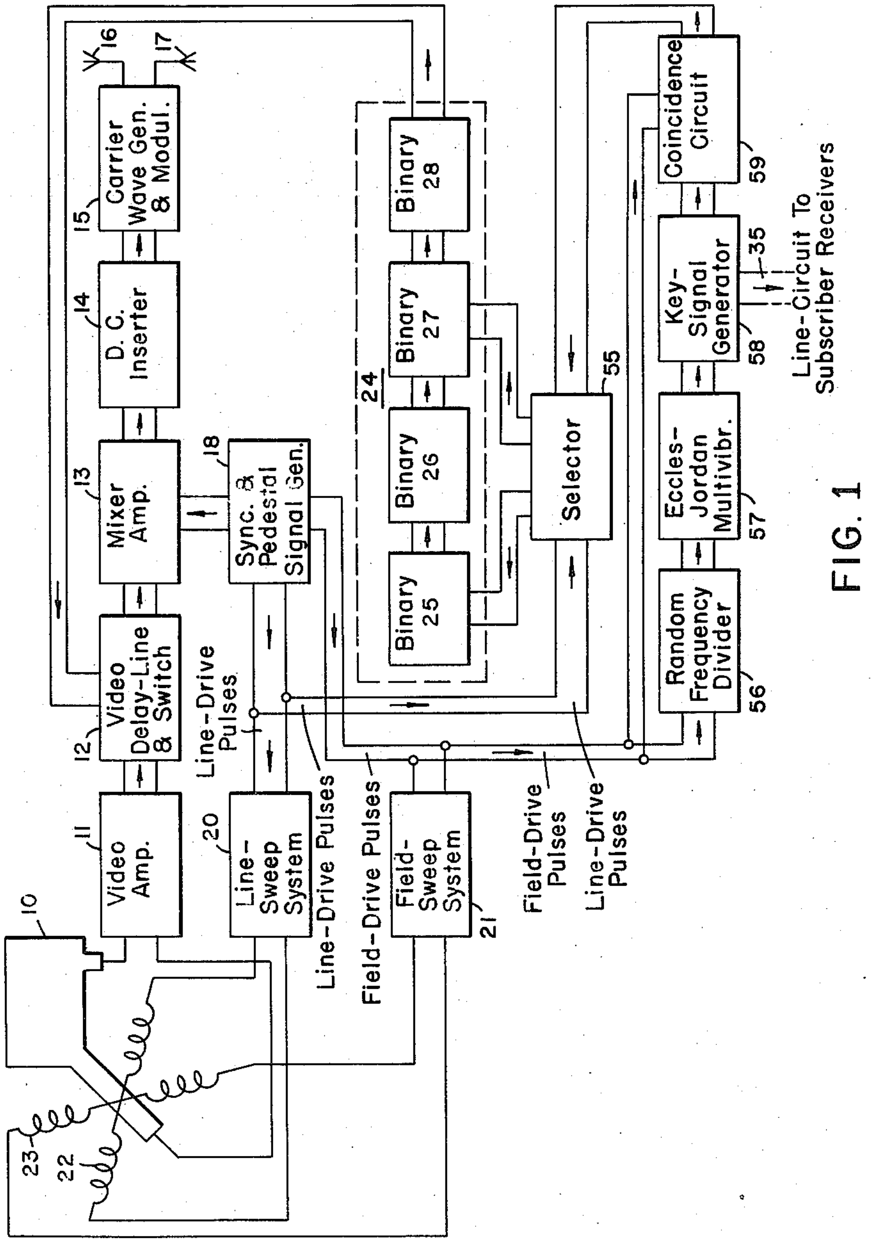
Figure 1 is a schematic representation of a subscription television transmitter constructed in accordance with one embodiment of the invention.

The transmitter of Figure 1 includes a picture-converting device 10 which may be an iconoscope, image orthicon or any other known device for deriving a video signal representing an image to be televised. The output terminals of device 10 are connected to a video amplifier 11 which, in turn, is connected to an encoding device or video delay line and switch 12 constructed in a manner similar to that disclosed and claimed in copending application Serial No. 243,039, entitled "Subscription Television System," filed August 22, 1951, and issued August 7, 1956, as Patent 2,758,153, in the name of Robert Adler, and assigned to the present assignee. Encoder 12 comprises a beam-deflection tube having at least two target elements to which video amplifier 11 may be selectively coupled in accordance with the deflected position of the beam. A time-delay network is connected in cascade with one of the target electrodes so that when the beam is incident upon that target a delay is introduced into the video channel; otherwise it is not. An actuating or deflection signal applied to the deflection elements of the beam tube determines whether or not the delay network is functionally included in the video channel of the transmitter. The output terminals of unit 12 are connected to a mixer amplifier 13 having output terminals coupled through a direct-current inserter 14 to a carrier-wave generator and modulator 15, the output terminals of unit 15 being connected to a suitable antenna circuit 16, 17.

The transmitter further includes a synchronizing and pedestal signal generator 18 connected to mixer amplifier 13 to supply the usual line- and field-synchronizing pulses and associated pedestal pulses thereto. Generator 18 also supplies line-drive pulses to a line-sweep system 20 and field-drive pulses to a field-sweep system 21 to synchronize the operation of these systems in well known fashion. The output terminals of sweep systems 20 and 21 are connected to line-deflection elements 22 and field-deflection elements 23 associated with device 10.

Generator 18 additionally supplies line-drive pulses through a selector 55, which may be an electronic switch of any known construction, to either one of the two input circuits of a counting mechanism 24 which in this instance comprises a series or chain of cascade-connected binary counters 25–28. The output terminals of counting mechanism 24 are connected to the deflection elements of encoder or video delay line and switch 12 to supply a deflection signal thereto.

With this arrangement, pulse-counting mechanism 24 effects actuation of encoding device 12 from one to another of its operating conditions at spaced intervals dependent upon the registration of a preselected count by the mechanism. Such a count registration is completed each time binary 28 is actuated from one condition to the other. The input circuits of counter 24 are individually coupled to an assigned one of the binary counting stages, that is, binary stage 25 is connected to one pair of output terminals of selector 55 and binary stage 27 is connected to another pair of output terminals of the selector, so that the absolute number of applied pulses required to effect the preselected count registration is determined by the energizing of these input circuits. To further explain, when line-drive pulses are applied through selector 55 to binary 25, the counting mechanism effects a 16:1 division to develop at its output terminals a square wave type of deflection signal having amplitude excursions occurring every 8 line-trace intervals, whereas when line-drive pulses are applied directly to binary 27 a 4:1 counting ratio is established to develop a deflection signal having characteristic variations occurring after every 2nd line trace.

In order to supply an actuating or selecting signal for selector 55 thereby to establish the sequence in which the input circuits of counter 24 are singularly connected to the pulse signal source 18, a random-frequency divider 56, which may be constructed in the manner disclosed in Patent 2,588,413, issued March 11, 1952, in the name of Erwin M. Roschke, and assigned to the present assignee, is connected to generator 18 to derive field-drive pulses therefrom. The output terminals of divider 56 are connected to an Eccles-Jordan multivibrator 57 which, in turn, is connected to a key-signal generator 58. One pair of output terminals of generator 58 is connected to a line circuit 35 which extends to the various subscriber receivers, while another pair of output terminals is connected to a coincidence circuit 59. Coincidence circuit 59, which is also supplied with field-drive pulses from synchronizing-signal generator 18, may be constructed as disclosed and claimed in copending application Serial No. 241,012, entitled "Subscription Television System," filed August 9, 1951, in the name of Carl G. Eilers, issued March 23, 1954, as Patent 2,673,239, and assigned to the present assignee. This circuit comprises a phasing circuit for producing a rectangular-shaped wave having amplitude excursions occurring only during field-retrace intervals, and preferably at randomly spaced time intervals which individually correspond to one or more field traces. The output terminals of coincidence circuit 59 are connected to selector 55.

In the operation of the transmitter of Figure 1, picture-converting device 10 develops video-frequency components representing the image intelligence of a program to be televised, and these components are amplified in video amplifier 11 and supplied to mixer amplifier 13 through coder or video delay line and switch 12. The video components are combined with the conventional synchronizing and pedestal components from generator 18 in mixer amplifier 13, and the resulting television signal is adjusted as to background level in D. C. inserter 14, modulated on a picture carrier in unit 15, and radiated to the subscriber receivers over an antenna 16, 17. As in any television broadcast, the accompanying audio information is modulated on a sound carrier and concurrently radiated. However, the sound system may be entirely conventional and since it constitutes no part of the instant invention, it has not been illustrated in order to avoid unduly encumbering the drawing.

The application of an actuating or deflection signal to coder 12 causes the radiated television signal to be effectively coded since the video components thereof do not have an invariable timing with respect to the synchronizing components; rather, their time relation is varied in accordance with a coding schedule represented by the actuating signal applied to the deflection elements of coder 12 to deflect the beam thereof from one to the other of its target elements.

Counting mechanism 24 operates in response to the recurring line-drive pulses from generator 18 via selector 55 and supplies to coder 12 a deflection control signal having characteristic variations determined by the mechanism. These variations occur after every 8 line-trace intervals or two line-trace intervals depending upon the condition of selector 55. That is, when the selector is in such a condition that line-drive pulses are supplied therethrough to binary 25, all of the binary stages are effective so that the output signal from mechanism 24 supplied to the deflection-control electrodes of coder 12 exhibits a period equal to 16 line-trace intervals. This signal therefore actuates the coder after each series of 8 line traces between its two operating conditions to establish different operating modes in the transmitter. One mode prevails when the actuating signal is established at its maximum value and another mode is established when that signal is established at its minimum value. On the other hand, when selector 55 is so conditioned that line-drive pulses are applied directly to binary 27, a 4:1 division is effected to supply a square wave actuating signal to the coder for changing modes after each 2 line traces.

In order to control the operation of the selector and therefore to determine which of the input circuits is energized, field-drive pulses are supplied to random-frequency divider 56 which triggers multivibrator 57 at randomly selected field-retrace intervals. The multivibrator develops a pulse modulated signal comprising pulse components initiated and terminated by successive randomly divided pulses from the frequency divider for application to key-signal generator 58. The key-signal generator supplies a burst of key signal to line circuit 35 and to coincidence circuit 59 for the duration of each pulse component of a predetermined polarity. Circuit 59 operates under the conjoint control of the field-drive pulses and the key signal to produce a pulse-modulated actuating or selecting signal which varies as to pulse duration in a random fashion and which experiences amplitude changes only during field-retrace intervals. The selector responds to this actuating signal and translates line-drive pulses to either one of the two input circuits of pulse-counting mechanism 24. The selecting schedule represented by the actuating signal is indicated to authorized subscriber receivers by means of the key signal translated to such receivers over line circuit 35.

It is possible that because of noise or other extraneous signals the decoding equipment at some of the subscriber receivers may fall out of step with the corresponding coding equipment at the transmitter, even though they have been supplied with the appropriate key signal. To remedy this condition, it is oftentimes desirable to provide a reset circuit which is operated from time to time during a subscription telecast to translate a signal to the coding equipment at the transmitter and to control the application of a corresponding signal to the decoding equipment at the various authorized receivers for resetting or "locking-in" of all the equipment. However, such a reset mechanism is disclosed in detail in the aforementioned application Serial No. 344,996, and since this mechanism forms no part of the present invention, it has been omitted in order to simplify the drawings.

Figure 2:
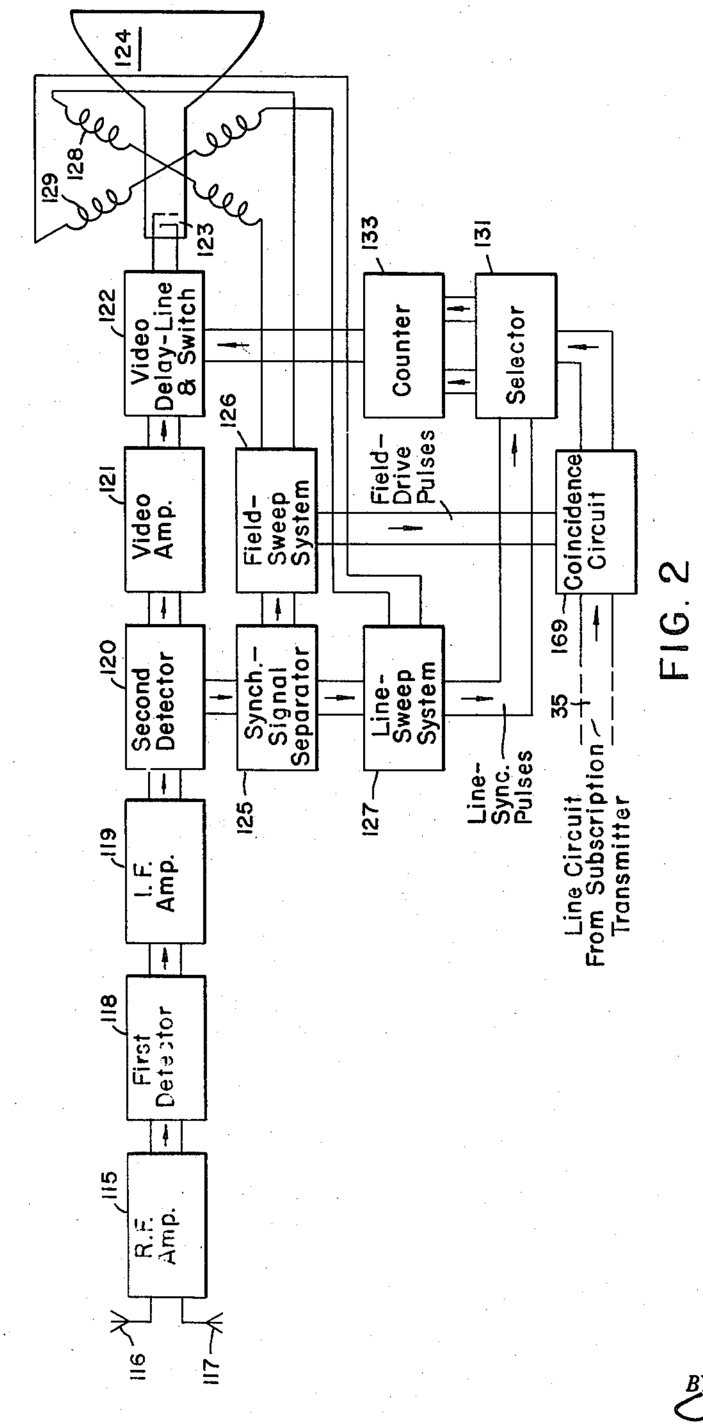
Figure 2 represents a subscription television receiver for operation in conjunction with the transmitter of Figure 1.

The receiver of Figure 2, which may utilize a subscription telecast from the transmitter of Figure 1, includes a radio-frequency amplifier 115 having input terminals connected to an antenna circuit 116, 117 and output terminals connected to a first detector 118. The first detector is connected through an intermediate-frequency amplifier 119 to a second detector 120 which, in turn, is connected to a video amplifier 121. The video amplifier is coupled through a video delay line and switch 122 to the input terminals 123 of a cathode-ray image-reproducing device 124. Decoder or video delay line and switch 122 may be similar in construction to coder 12 utilized at the transmitter but is operated in reverse manner so that when coder 12 is in a "delaying" condition, decoder 122 is in an "undelaying" condition and vice versa. Second detector 120 is also connected to a synchronizing-signal separator 125 which, in turn, is connected to a field-sweep system 126 and to a line-sweep system 127. Sweep systems 126 and 127 are connected respectively to the field-deflection elements 128 and line-deflection elements 129 associated with device 124.

Line-sweep system 127 is further connected to the input terminals of a selector 131 to supply line-synchronizing pulses thereto, and this selector is connected to two different input circuits of a counter 133. Selector 131 and counter 133 may be constructed exactly as described for the corresponding elements 55 and 24, respectively, at the transmitter. The output terminals of pulse counter 133 are connected to video delay line and switch 122 in a complementary sense as compared with the corresponding connection from the counter 24 to coder 12 at the transmitter in order effectively to compensate for timing variations of the television signal referred to hereinbefore.

In order to develop the appropriate selecting or actuating signal for selector 131, a coincidence circuit 169 is connected to line circuit 35 extending from the transmitter. This circuit, which is also connected to field-sweep system 126 to derive field-drive pulses therefrom, preferably is identical to the corresponding coincidence circuit 59 at the transmitter. The output terminals of circuit 169 are connected to selector 131.

In the operation of the receiver of Figure 2, the subscription television signal from the transmitter of Figure 1 is intercepted by antenna circuit 116, 117, amplified in radio-frequency amplifier 115 and heterodyned to the selected intermediate frequency of the receiver in first detector 118. The resulting intermediate-frequency signal is amplified in intermediate-frequency amplifier 119 and detected in second detector 120 to produce a composite video signal. The video signal is amplified in amplifier 121 and supplied to the input electrodes 123 of reproducing device 124 through decoder or video delay line and switch 122. The synchronizing components of the television signal are separated in separator 125 and supplied to sweep systems 126 and 127 in order that the field and line scansions of device 124 may be controlled in synchronism with the incoming signal.

Line-synchronizing pulses are derived from sweep system 127 and supplied through selector 131 to either one of the input circuits of counter 133. If the subscriber has been properly authorized to receive the key signal from the subscription transmitter, coincidence circuit 169 is supplied with that signal and operates in substantial time coincidence with the corresponding circuit 59 at the transmitter. A selecting signal is thus developed for controlling the operation of selector 131 in synchronism with the operation of selector 55 at the transmitter to selectively apply the line-synchronizing pulses to the two input circuits of counter 133. Counter 133 therefore supplies a decoding signal to the deflection-control electrodes of decoder 122 which is identical in phase and frequency to the signal supplied to coder 12 at the transmitter. Consequently, each time coder 12 at the transmitter is actuated to change the timing between the video and synchronizing components of the television signal, decoder 122 at the receiver is also actuated to compensate for such variations to thereby effect intelligible image reproduction.

Figure 3:
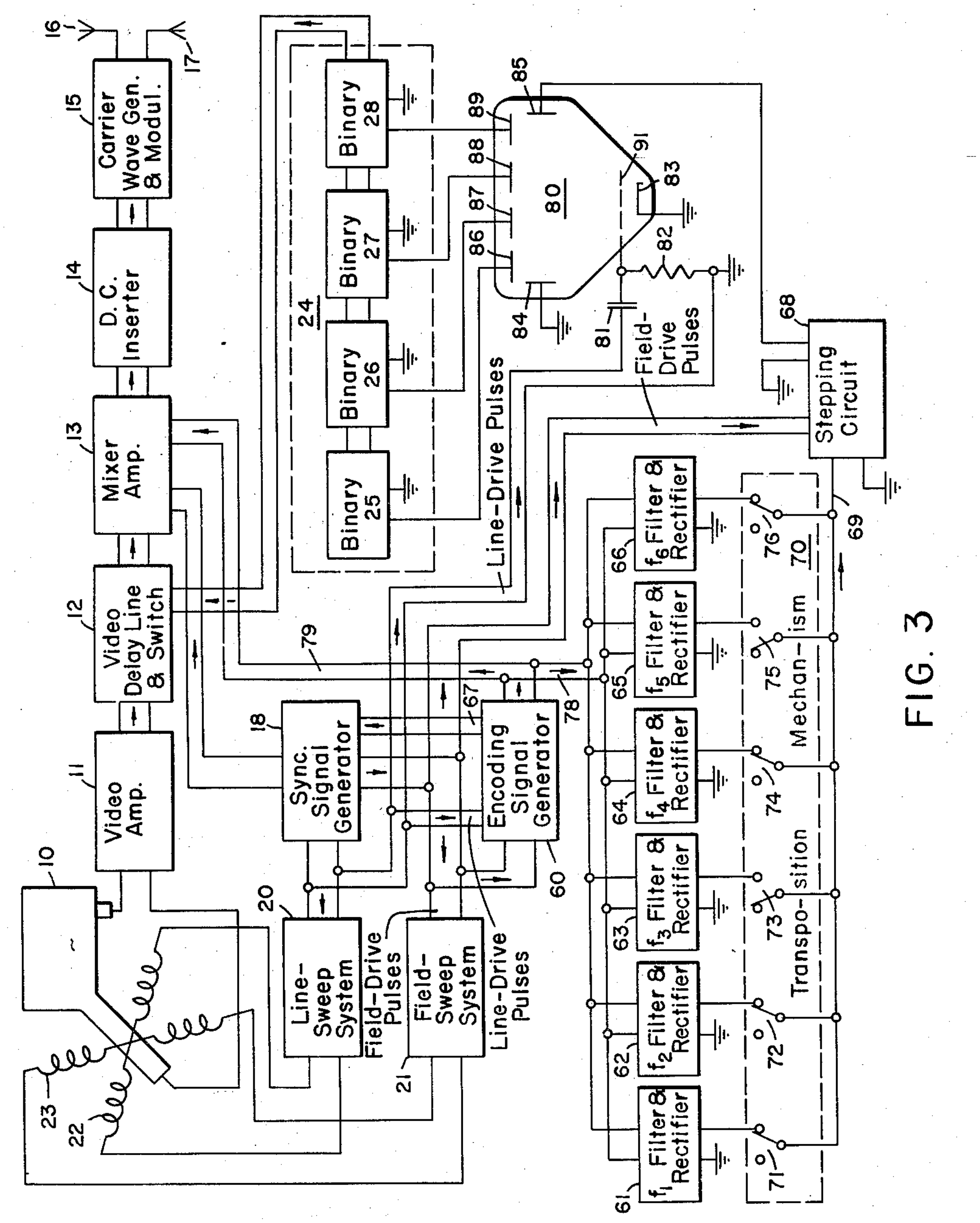
Figure 3 represents a subscription television transmitter constituting another embodiment of the invention.

In accordance with another embodiment of the invention, a selector device is operated under the control of an air-borne code conveying signal to selectively apply line-synchronizing pulses to any one of several input circuits of the counting mechanism to thereby establish any one of a number of counting ratios. A transmitter for effecting such a scheme is illustrated in Figure 3. The elements therein which are identical to corresponding elements in Figure 1 are designated by similar reference numerals. In this case, however, generator 18 further supplies field-drive pulses to one input circuit of an encoding signal generator 60 and line-drive pulses to another input circuit of the generator. Unit 60, which has one pair of output terminals connected over conductors 67 to synchronizing-signal generator 18 and another pair of output terminals connected over conductors 79 to a pair of input terminals of mixer amplifier 13 and over conductors 78 to a series of filter and rectifier units 61–66, is provided to develop a series of encoding signal components individually having a predetermined identifying characteristic, such as frequency, and collectively determining a coding schedule in accordance with their order within the series. Such a generator is disclosed and claimed in copending application Serial No. 326,107, filed December 15, 1952, and issued February 11, 1958, as Patent 2,823,252, in the name of Jack E. Bridges, and assigned to the present assignee.

As described in detail in the last-mentioned Bridges application, a combination of encoding signal components is developed during each of a series of spaced time intervals, such as field-retrace intervals, and this combination may comprise a group of six bursts of various signal frequencies, preferably randomly sequenced and randomly appearing within any such interval. These bursts individually occur in point of time between the line-synchronizing pulses and are superimposed on the vertical-blanking pulse of the composite signal for transmission to subscriber receivers. The encoding signal components are also applied over conductors 78 to the input circuits of frequency-selective filter and rectifier units 61–66 to facilitate their separation one from the other for selective application to a series of input circuits of a transposition mechanism 70. This mechanism, which is adjusted in accordance with a predetermined switch setting pattern, is provided for the purpose of selectively connecting any one or all of its input circuits, and consequently frequency-selective units 61–66, to a common output conductor 69, and may comprise a family of single-pole single-throw toggle switches 71–76 as illustrated in Figure 3 or mechanism 70 may include a wafer switch arrangement as disclosed in copending application Serial No. 338,033, filed February 20, 1953, in the name of George V. Morris, now abandoned in favor of continuation-in-part application Serial No. 407,192, filed February 1, 1954, and assigned to the present assignee.

Common output conductor 69 is connected to one input terminal of a stepping circuit 68, the other input terminal of which is connected to ground. Circuit 68 may be of any well-known construction such that a repeating stair-shaped output signal having any desired number of steps in each cycle is produced in response to a series of input pulses. In the illustrated case four such steps are preferred, as will be readily apparent. This stepping circuit has another pair of input terminals connected to generator 18 to derive field-drive pulses therefrom for reset purposes, and has its output terminals connected to a pair of deflection control elements 84, 85 of a well-known beam-deflection device 80. This device has a series of target anodes 86–89 individually connected to an assigned one of binary counters 25–28. The intensity-control electrode 91 of device 80 is connected to generator 18 over a series-connected coupling condenser 81 and a shunt-connected grid-leak resistor 82 to intensity modulate the electron beam of the beam tube in accordance with the line-synchronizing pulses. Cathode 83 of the device is connected to ground.

In the operation of the transmitter of Figure 3, generator 60 develops during each field-retrace interval a combination of encoding signal components of various frequencies. These components are applied to filter and rectifier units 61–66 over conductors 78 wherein they are separated from one another for individual application to the various input circuits of transposition mechanism 70. In the case illustrated, only toggle switches 71, 72, 74 and 76 establish connections from their respective rectifiers to common conductor 69 so that each signal burst of frequency $f_1$, $f_2$, $f_4$, or $f_6$ from generator 60 is translated to stepping circuit 68. This circuit, which is reset to a reference operating condition at the beginning of each field-retrace interval by means of the field-drive pulses applied thereto, is advanced one step of its cycle in response to each applied pulse over conductors 69. For convenience, it may be assumed that the stepping circuit establishes the potential of its output terminal at its least positive or most negative value in operating instants in which it is in its aforesaid reference operating condition. As a consequence, the electron beam of device 80 is subjected to a maximum deflection effect and bias potentials (not shown) may be employed if necessary to cause the beam to be deflected beyond (to the left) target element 86 for this condition.

The beam of device 80 is then successively displaced to scan each of anodes 86—89 in response to the application of signal pulses to stepping circuit 68. That is, in response to the first rectified signal burst applied to the stepping circuit during a field-retrace interval, the beam is directed to impinge upon anode 86; upon receipt of the second such burst, the beam is incident upon target 87; in response to the third and fourth rectified signal bursts of the encoding signal combination, the beam is directed to anodes 88 and 89, respectively; in response to the fifth rectified signal burst on conductors 69 the beam is returned to its reference condition preparatory to executing a second cycle if sufficient numbers of pulses are received during the particular retrace interval. The position of the beam established by circuit 68 at the conclusion of the combination of encoding signal pulses received during any field-retrace interval is maintained fixed until the next such interval because circuit 68 receives no pulses during the intermediate field trace period.

Thus, the number of pulses applied to the stepping circuit during any one particular field-retrace interval determines which anode becomes the active anode that receives the electron beam during the immediately succeeding field trace. Moreover, the binary stage of counter 24 that is connected to the active anode becomes the effective input stage of the counter since the electron beam of device 80 is modulated by line-drive pulses impressed on its control electrode 91 and transfers such pulses to the counter through the active anode. For example, if at the end of a field-retrace period the beam of device 80 is directed to anode 87, line-drive pulses are effectively translated to binary 26 from generator 18 for the ensuing field-trace interval and counter 24 exhibits an 8:1 ratio. The resulting square wave output signal developed for application to coder 12 effects mode changes in the transmitter every 4 line traces. Similarly, when stepping circuit 68 causes the beam to come to rest on target anode 89, only binary 28 is effective and mode changes are made in the transmitter every line trace. In view of the random manner in which the frequency components appear in the encoding signal generated in unit 60, it is apparent that the mode-determining process causes the frequency at which the operating mode changes to vary from time to time between several different values and in accordance with a random coding schedule. As a consequence, the transmission is very effectively coded.

In the particular illustration, the encoding signal components are produced during a portion of the vertical-retrace interval so that the rate of operation of the counter is determined between field-trace intervals. However, it should be understood that the encoding signal may be developed and utilized throughout the field-trace intervals to effectively change the frequency of the output signal from the counter at a faster-than-field rate, if so desired. A suitable generator for producing such signal bursts throughout the field-trace periods is described in copending application Serial No. 310,309, filed September 18, 1952, in the name of Alexander Ellett, and assigned to the present assignee.

In order that subscriber receivers may utilize the coded transmission, it is necessary that the encoding signal components developed by generator 60 during each field-retrace interval be made known to them. To that end, the encoding signal is applied to mixer amplifier 13 over conductors 79 at the same time it is delivered to filter and rectifier units 61–66 to be combined with the composite video signal for transmission to subscriber receivers. The bursts of various signal frequencies, which constitute the encoding signal, occur between the line-drive pulses superimposed on the vertical-blanking pulse, and therefore it is desirable that the amplitude level of the blanking pulse be modified to effect an inward modulation of the blanking pulse by the coding signal components. To that end, appropriate pulses are supplied to synchronizing-signal generator 18 over conductors 67 to downward modulate the vertical-blanking pulses at the appropriate times.

Figure 4:
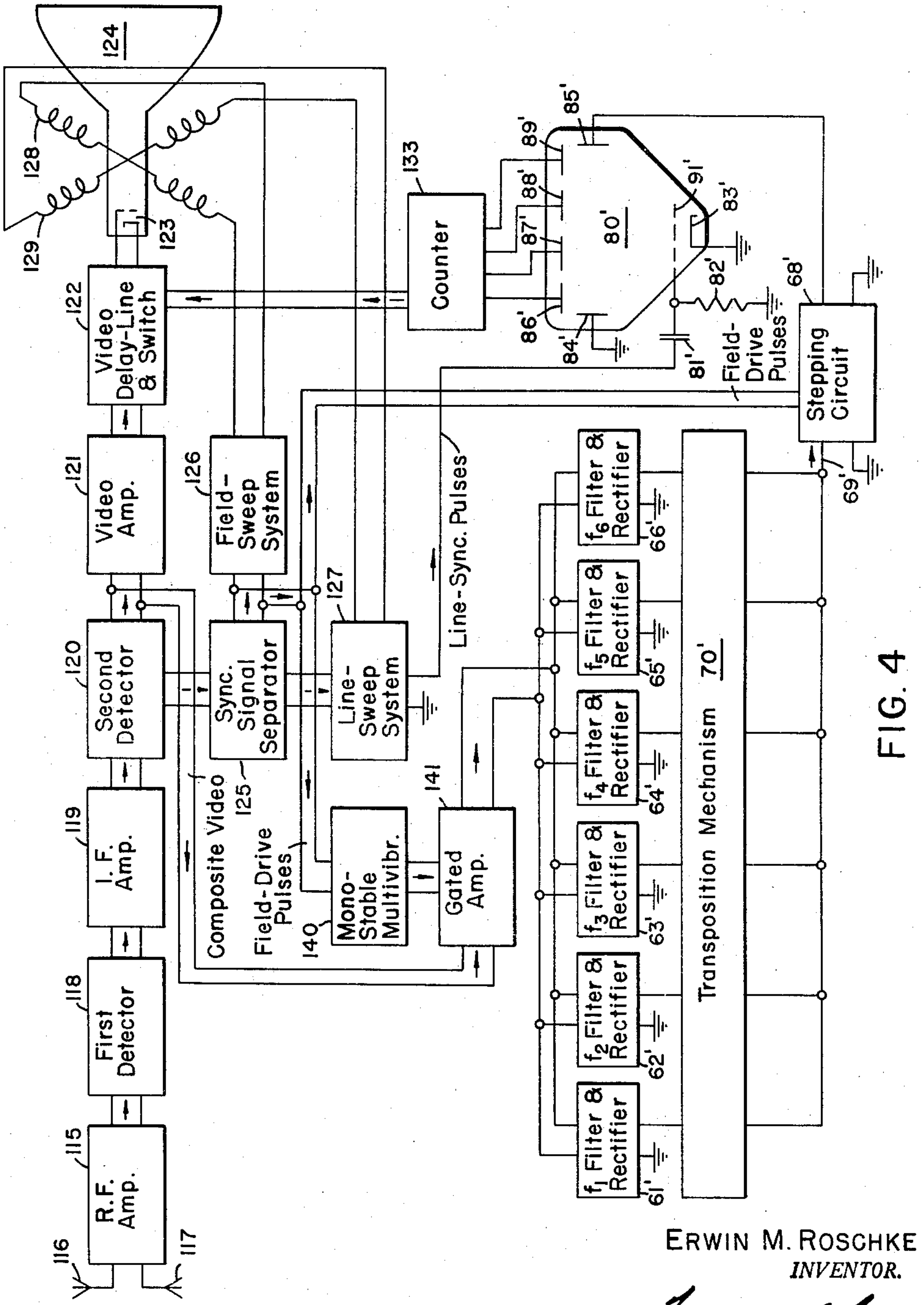
Figure 4 represents a subscription television receiver for operation in conjunction with the transmitter of Figure 3.

The receiver of Figure 4 which is capable of utilizing the telecast emanating from the transmitter of Figure 3, is generally similar to that of Figure 2, and identical reference numerals have been applied to corresponding elements thereof. The encoding arrangement of Figure 4 is similar to that shown in Figure 3 and corresponding components are indicated by the primed reference numerals. Briefly, line-synchronizing pulses are derived from the line-sweep system 127, instead of the synchronizing-signal generator as in the case of the transmitter, and are impressed on the intensity-control electrode 91' to modulate the electron beam of tube 80'. Counter 133 is, of course, similar to counter 24 at the transmitter and is also provided with four corresponding input circuits to receive the line-synchronizing components. Decoder 122 is controlled to operate in a complementary fashion to coder 12 at the transmitter in order effectively to compensate for the variations in the timing of the received television signal.

In order to facilitate the separation of the encoding signal components from the composite television signal, it is desirable to provide circuitry which will "gate in" only that portion of the composite signal containing such components. To that end, field-drive pulses are derived from synchronizing-signal separator 125 and supplied to a mono-stable multivibrator 140 having output terminals connected to a normally-closed gated amplifier 141. The output terminals of second detector 120 are also connected to gated amplifier 141 to supply the composite video signal thereto, and the output circuit of this amplifier is connected to the input circuits of each one of a series of filter and rectifier units 61′–66′.

The output circuits of rectifiers 61′–66′ are connected to the input terminals of a transposition mechanism 70′ provided for the purpose of selectively connecting any one or all of the output circuits from filter and rectifier units 61′–66′ to common conductor 69′. If the various connections established by mechanism 70′ are identical to the connections established by transposition mechanism 70 at the transmitter, decoding is effected. The mechanism setting information is disseminated only to authorized subscribers and a suitable charge may, of course, be assessed for such information.

In the operation of the receiver of Figure 4, field-drive pulses from separator 125 are supplied to mono-stable multivibrator 140 to produce a gating pulse for normally-closed gated amplifier 141. The parameters of the multivibrator are so chosen that the gating pulse overlaps in point of time that portion of the field-retrace interval of the composite video signal which includes the encoding signal components. The composite video signal is continuously applied to the input circuit of amplifier 141, but only the information contained during the interval of the gating pulse is translated to filter and rectifier units 61′–66′. The amplifier 141 is thus "opened" during the times the signal bursts of various frequencies, representing the encoding signal components, are received and since units 61′–66′ are individually tuned to an assigned one of these frequencies, such bursts are separated out from the composite video signal and from each other. Each time a burst of signal frequency occurs in the encoding signal, it is channeled over a corresponding input circuit of transposition mechanism 70′ for selective application to common conductor 69′.

If the various switch elements of transposer 70′ are adjusted to the same setting as the corresponding transposition mechanism at the transmitter, conductor 69′ receives pulses similar to those received by conductor 69 at the transmitter and stepping circuit 68′ operates in synchronism with stepping circuit 68 to position the beam of device 80′ to the appropriate one of anodes 86′–89′. Of course, as is the case with stepping circuit 68 at the transmitter, unit 68′ is reset to a reference operating condition by means of the applied field-drive pulses at the beginning of each field-retrace interval.

Counter 133 therefore develops a deflection-control signal at its output terminals which undergoes amplitude excursions in exact synchronism with the output signal of counter 24 at the transmitter of Figure 3. This signal is applied to decoder 122 to effect actuation thereof in time coincidence with, but in a complementary sense to, the actuation of coder 12 at the transmitter so that the video components applied to the input electrodes 123 of image-reproducing device 124 are suitably compensated to effect intelligible image reproduction.

The invention provides, therefore, an improved subscription television system wherein a coding signal for an encoding device is developed which represents a selected one of several schedules at one time and a different selected schedule at other times to effect a highly complex mode changing pattern.

While particular embodiments of the invention have been shown and described, modifications may be made, and it is intended in the appended claims to cover all such modifications as may fall within the true spirit and scope of the invention.

I claim:

1. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of counting stages included in said counting mechanism; at least two input circuits individually coupled to an assigned one of said stages so that the absolute number of applied pulses required to effect said prescribed count registration is determined by the energizing of said input circuits; a source of signal pulses to be applied to said counting mechanism; a selector for connecting said source to a selected one of said input circuits at any operating instant; and means for applying a selecting signal to said selector to establish the sequence in which said input circuits are singularly connected to said source in accordance with a schedule represented by said selecting signal.

2. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of cascade-connected binary counting stages included in said counting mechanism; at least two input circuits individually coupled to an assigned one of said stages so that the absolute number of applied pulses required to effect said prescribed count registration is determined by the energizing of said input circuits; a source of signal pulses to be applied to said counting mechanism; a selector for connecting said source to a selected one of said input circuits at any operating instant; and means for applying a selecting signal to said selector to establish the sequence in which said input circuits are singularly connected to said source in accordance with a schedule represented by said selecting signal.

3. In a subscription television system for translating a television signal including video and synchronizing components: an encoding device havig at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of cascade-connected counting stages included in said counting mechanism; at least two input circuits individually coupled to an assigned one of said stages so that the absolute number of applied pulses required to effect said prescribed count registration is determined by the energizing of said input circuits; a source of signal pulses, individually representing one of said synchronizing components, to be applied to said counting mechanism; a selector for connecting said source to a selected one of said input circuits at any operating instant; and means for applying a selecting signal to said selector to establish the sequence in which said input circuits are singularly connected to said source in accordance with a schedule represented by said selecting signal.

4. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of cascade-connected counting stages included in said counting mechanism; at least two input circuits individually coupled to an assigned one of said stages so that the absolute number of applied pulses required to effect said prescribed count registration is determined by the energizing of said input circuits; a source of signal pulses to be applied to said counting mechanism; a selector including a beam-deflection device for connecting said source to a selected one of said input circuits at any operating instant; and means for applying a selecting signal to said beam-deflection device to effect actuation thereof for establishing the sequence in which said input circuits are singularly connected to said source in accordance with a schedule represented by said selecting signal.

5. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of cascade-connected counting stages included in said counting mechanism; at least two input circuits individually coupled to an assigned one of said stages so that the absolute number of applied pulses required to effect said prescribed count registration is determined by the energizing of said input circuits; a source of signal pulses to be applied to said counting mechanism; a beam deflection device including a source of electrons, means for forming electrons from said source into an electron beam, a plurality of beam-receiving anodes each of which is connected to a respective one of said input circuits, an intensity-control electrode coupled to said source for modulating said beam, and a pair of deflection-control elements responsive to an applied deflection signal for selectively directing said beam to said beam-receiving anodes; and means for applying a deflection signal to said deflection-control elements to establish the sequence in which said input circuits are effectively connected to said source in accordance with a schedule represented by said selecting signal.

6. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a plurality of cascade-connected counting stages included in said counting mechanism; at least two input circuits individually coupled to an assigned one of said stages so that the absolute number of applied pulses required to effect said prescribed count registration is determined by the energizing of said input circuits; a source of signal pulses to be applied to said counting mechanism; a beam-deflection device including a source of electrons, means for forming electrons from said source into an electron beam, a plurality of beam-receiving anodes each of which is connected to a respective one of said input circuits, an intensity-control electrode coupled to said source for modulating said beam, and a pair of deflection-control elements responsive to an applied deflection signal for selectively directing said beam to said beam-receiving anodes; and means including a stepping circuit for directing said beam successively from one to another of said anodes to establish the sequence in which said input circuits are effectively connected to said source in accordance with a schedule represented by said selecting signal.

7. In a subscription television transmitter for transmitting a television signal including video components and synchronizing components: a coding device having at least two operating conditions each of which establishes a different operating mode in said transmitter; a pulse-counting mechanism coupled to said coding device to effect actuation thereof from one to another of its operating conditions at spaced intervals dependent upon the registration of a preselected count by said counting mechanism– a plurality of cascade-connected counting stages included in said counting mechanism; at least two input circuits individually coupled to an assigned one of said counting stages so that the absolute number of applied pulses required to effect said preselected count registration is determined by the energizing of said input circuits; a source of signal pulses to be applied to said counting mechanism; a selector for connecting said source to a selected one of said input circuits at any operating instant; means for applying a selecting signal to said selector to establish the sequence in which said input circuits are singularly connected to said source in accordance with a schedule represented by said selecting signal; and means for transmitting a signal bearing information concerning said selecting schedule to subscriber receivers.

8. In a subscription television receiver for utilizing a coded television signal: a decoding device having at least two operating conditions each of which establishes a different operating mode in said receiver; a pulse-counting mechanism coupled to said decoding device to effect actuation thereof from one to another of its operating conditions at spaced intervals dependent upon the registration of a preselected count by said counting mechanism; a plurality of cascade-connected counting stages included in said mechanism; at least two input circuits individually coupled to an assigned one of said stages so that the absolute number of applied pulses required to effect said preselected count registration is determined by the energizing of said input circuits; a source of signal pulses to be applied to said counting mechanism; a selector for connecting said source to a selected one of said input circuits at any operating instant; and means for applying a selecting signal to said selector to establish the sequence in which said input circuits are singularly connected to said source in accordance with a schedule represented by said selecting signal effectively to decode said television signal.

9. In a subscription television receiver for utilizing a television signal coded in accordance with a coding schedule, and for concurrently utilizing a coding signal conveying information concerning said coding schedule, comprising: a decoding device having at least two operating conditions each of which establishes a different operating mode in said receiver; a pulse-counting mechanism coupled to said decoding device to effect actuation thereof from one to another of its operating conditions at spaced intervals dependent upon the registration of a preselected count by said counting mechanism; a plurality of cascade-connected counting stages included in said mechanism; at least two input circuits individually coupled to an assigned one of said stages so that the absolute number of applied pulses required to effect said preselected count registration is determined by the energizing of said input circuits; a source of signal pulses to be applied to said counting mechanism; a selector for connecting said source to a selected one of said input circuits at any operating instant; and means for supplying said coding signal to said selector to establish the sequence in which said input circuits are singularly connected to said source to effect actuation of said decoding device in accordance with said coding schedule effectively to decode said television signal.

References Cited in the file of this patent

UNITED STATES PATENTS

| | | |
|---|---|---|
| 2,547,598 | Roschke | Apr. 3, 1951 |
| 2,567,545 | Brown | Sept. 11, 1951 |
| 2,757,226 | Zworykin | July 31, 1956 |